(12) United States Patent
Hoyt

(10) Patent No.: US 6,543,314 B1
(45) Date of Patent: Apr. 8, 2003

(54) TORQUE WRENCH ASSEMBLY

(75) Inventor: David A. Hoyt, Bristol, CT (US)

(73) Assignee: Padahoyt Tools, Bristol, CT (US)

( * ) Notice: Subject to any disclaimer, the term of this patent is extended or adjusted under 35 U.S.C. 154(b) by 0 days.

(21) Appl. No.: 10/015,422

(22) Filed: Dec. 12, 2001

(51) Int. Cl.$^7$ ................................................ B25B 17/00
(52) U.S. Cl. .................... 81/57.29; 81/57.22; 81/57.32; 81/57.36; 74/665 H; 74/665 GD; 74/397
(58) Field of Search ............................ 81/57.36, 57.12, 81/57.13, 57.22, 57.28, 57.29, 57.32; 74/665 H, 665 GD, 665 F, 665 P, 395, 396, 397, 406, 412 R, 413, 414, 416, 63

(56) References Cited

U.S. PATENT DOCUMENTS

| | | | |
|---|---|---|---|
| 1,800,248 A | * | 4/1931 | Coates ........................ 81/57.22 |
| 1,901,436 A | * | 3/1933 | Coates ........................ 81/57.22 |
| 2,179,171 A | * | 11/1939 | Boho ........................... 74/413 |
| 2,644,357 A | | 7/1953 | Farmer |
| 2,742,807 A | | 4/1956 | Ferm et al. |
| 2,781,682 A | | 2/1957 | Herndon |
| 3,905,254 A | | 9/1975 | Palatnick et al. |
| 4,063,475 A | * | 12/1977 | Perkins ........................ 81/57.22 |
| 4,261,225 A | * | 4/1981 | Zahradnik ................. 74/412 R |
| 4,279,314 A | | 7/1981 | Taub |
| 4,515,043 A | | 5/1985 | Gray |
| 4,942,794 A | | 7/1990 | Snyder et al. |
| 5,074,170 A | | 12/1991 | Shirley |
| 5,218,758 A | | 6/1993 | Nguyen |
| 5,407,147 A | * | 4/1995 | Nakamura ................. 74/665 H |
| 6,253,644 B1 | | 7/2001 | Duquette |
| 6,305,236 B1 | | 10/2001 | Sturdevant |

* cited by examiner

Primary Examiner—D. S. Meislin
(74) Attorney, Agent, or Firm—Carmody & Torrance LLP

(57) ABSTRACT

A torque wrench assembly system comprising a housing, a transfer shaft positioned in the housing, a first drive gear arrangement coupled to the transfer shaft; at least a second drive gear arrangement slidably coupled to the transfer shaft; a first drive shaft coupled to the first drive gear arrangement and having an end extending from the housing; a second drive shaft coupled to the second drive gear arrangement and having an end extending from the housing; a torque generating device that is coupleable to the transfer shaft, to the first drive gear arrangement and/or the first drive shaft; wherein the distance between the first drive shaft and the second drive shaft is slidably adjustable by the slidability of the at least second drive gear arrangement along the transfer shaft; and wherein the coupling of the first drive gear arrangement and the at least second drive gear arrangement via the transfer shaft provides that the first and second drive shafts can provide an at least essentially equal torque.

31 Claims, 4 Drawing Sheets

TORQUE WRENCH ASSEMBLY

FIELD OF THE INVENTION

The present invention relates generally to torque wrenches, and more particularly, to a novel and slidably adjustable torque wrench assembly that is designed to simultaneously tighten more than one bolt, nut, screw or the like.

BACKGROUND OF THE INVENTION

A variety of torque wrench constructions are well known in the art. Such wrenches have been used in various mechanical assembling operations to tighten nuts and bolts rapidly and at the same time. Multi-drive shaft torque wrenches are also known, and are constructed and used with the objective of trying to ensure that the particular parts, such as couplings, brackets in plumbing or automobile operations and/or automobile wheels, are joined together or mounted without having to apply an excessive degree of unbalanced pressure or torque to any one bolt or nut, which tends to weaken or fracture the threads thereof. Other damaging effects of such unequal or unbalanced tightening may be the bending, weakening or fracturing of the coupling, brackets, etc. which are held together by the parts being tightened. That is, for example, the prior art recognized that when fasteners on a plumbing coupler are not tightened simultaneously it can cause the coupler to buckle on one side and increase the risk of leaking. Attempts to address and overcome the problem of being able to clamp, tighten or join an object, such as a wheel or the like by using more than one fastener at a time are well known and are described in patents such as U.S. Pat. No. 5,074,170.

Unfortunately, it is perceived that the state of the art multi-drive shaft torque wrenches are still less then desirable. One main perceived drawback in the prior art is the inability to adjust the distance between the drive shafts onto which sockets (or the like) are mounted. For example, U.S. Pat. No. 5,074,170, describes a lug nut tool 1 that uses and needs an intermediate gear 2 to rotatably couple the various drive shafts, and is exemplary illustrated in the present application as FIG. 4. For example, the inner center shaft, such as that coupled to gear 3, is coupled to the outer drive shaft 4 via intermediate gear 2. As such, it can be readily seen that such a device is unusable for any lug nut configuration different from the standardized configuration provided for in the described lug nut tool of FIG. 4. For example, moving gear 5 away from intermediate gear 2 clearly will cause the disengagement therebetween and quite obviously, lug nut tool 1 does not appear to lend itself to permit gear 5 to move any closer to gear 3.

Based thereon, the present inventor believes that further developments in the state of the art multi-shaft torque wrenches are desirable. For example, it is believed to be desirable to have a torque wrench assembly in which the position of one or more of the drive shafts is slidably adjustable relative to each other. The invention disclosed herein achieves the objectives and advantages set forth and overcomes the aforementioned perceived drawbacks.

OBJECTS AND ADVANTAGES OF THE INVENTION

It is an object and advantage of the present invention to provide a novel torque wrench assembly that simultaneously tightens one or more fasteners to a predetermined torque specification.

Yet another object of the invention is to provide a novel torque wrench assembly in which the drive shafts thereof are slidably adjustable so as to provide a unique and widely utilizable invention that can be appreciated and utilized in a variety of operations, such as in connection with the plumbing or automobile industry and in connection with a variety of configurations of fasteners, such as lug nuts, clamps, plumbing fixtures, just to name a few by way of example and not limitation.

It is a further object of the present invention to provide such a torque wrench assembly that can be handheld and easily operated.

Further objects and advantages of this invention will become more apparent from a consideration of the drawings and ensuing description.

SUMMARY OF THE INVENTION

The objects and advantages are realized by a torque wrench assembly constructed in accordance with embodiments of this invention, wherein such a torque wrench assembly is disclosed.

Generally speaking, the present invention is directed to a torque wrench assembly comprising a housing; a transfer shaft at least a portion of which is positioned in the housing, a first drive gear arrangement coupled to the transfer shaft; at least a second drive gear arrangement slidably coupled to the transfer shaft; a first drive shaft coupled to the first drive gear arrangement and having an end extending from the housing; a second drive shaft coupled to the second drive gear arrangement and having an end extending from the housing; a torque generating device that is coupleable to the transfer shaft, the first drive shaft or the first drive gear arrangement; whereby the distance between the first drive shaft and the second drive shaft is slidably adjustable by the slidability of the at least second drive gear arrangement along the transfer shaft; and the coupling of the first drive gear arrangement and the at least second drive gear arrangement via the transfer shaft provides that the first and second drive shafts are able to provide an at least an essentially equal torque.

In one preferred construction, the first drive gear arrangement is positioned within a first gear housing and the second drive gear arrangement is positioned within a second gear housing. Further, the first drive gear arrangement preferably comprises a first worm gear mounted on the transfer shaft and a second worm gear orthogonally aligned with and rotatably coupled to the first worm gear, and the second drive gear arrangement preferably comprises a third worm gear mounted on the transfer shaft and a fourth worm gear orthogonally aligned with and rotatably coupled to the third worm gear, such that the first drive shaft is coupled to the second worm gear and the second drive shaft is coupled to the fourth worm gear, all .of which is by helical threads on the outer surface of the worm gears.

Preferably, the housing includes a cavity; and at least the second drive gear arrangement is slideably disposed within the cavity and slides therein thus enabling the increase and decrease of the distance between the first drive shaft and the second drive shaft. In one configuration, the first drive shaft extends through a bottom of the housing and is coupled to the torque generating device. The torque generating device may include an adapter that is directly coupled to the first drive gear arrangement. In another embodiment, and end of the transfer shaft may extend outside of the housing and the torque generating device is coupled thereto, such as by utilizing an adaptor, for example. In such a configuration, both drive gear arrangements can be slideable. In one example, the torque generating device is a ratchet wrench.

A coupling arrangement that utilizes the present invention for use with the torque generating device is also specifically disclosed and claimed.

BRIEF DESCRIPTION OF THE DRAWINGS

The above set forth and other features of the invention are made more apparent in the ensuing Detailed Description of the Preferred Embodiments when read in conjunction with the attached Drawings, wherein.

Identically labeled elements appearing in different ones of the above-described figures refer to the same elements but may not be referenced in the description for all figures.

DETAILED DESCRIPTION OF THE PREFERRED EMBODIMENTS

Figure 1:
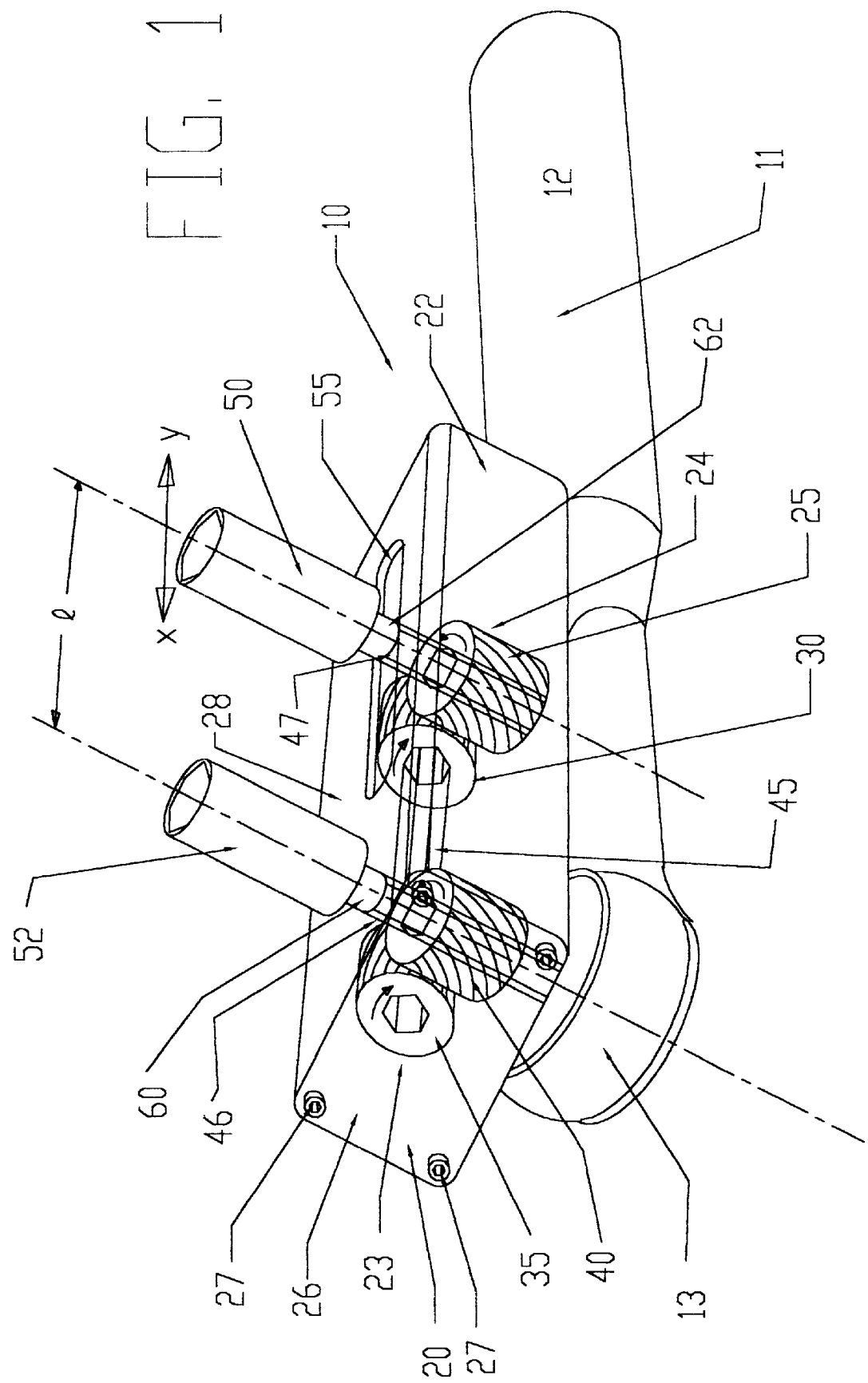
FIG. 1 is a perspective view of a torque wrench assembly, including a wrench member generally indicated at 11 and a coupling arrangement used therewith, generally indicated at 20, constructed in accordance with a first embodiment of the present invention, certain features of which have been omitted to clearly understand this first embodiment.
Figure 2:
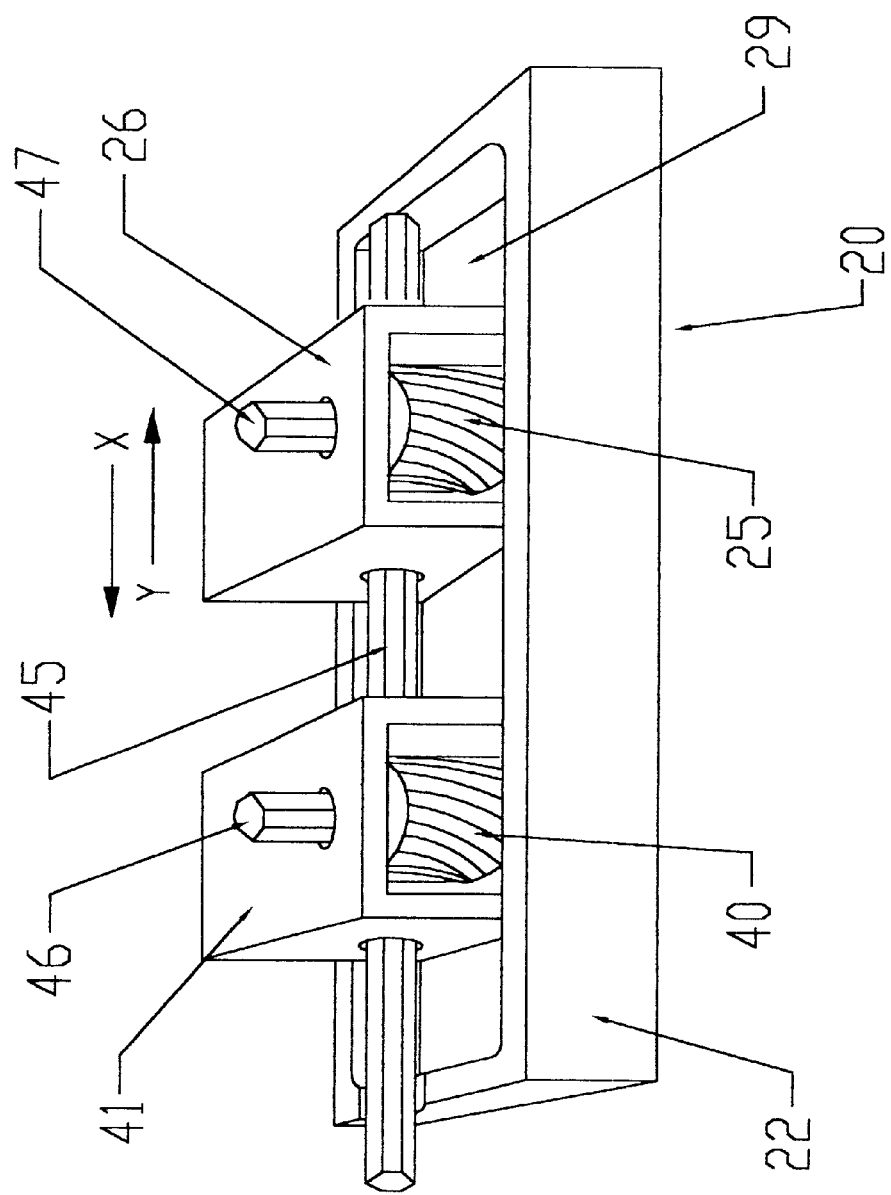
FIG. 2 is a second perspective view of internal components of the coupling arrangement of FIG. 1.

Reference is first made to FIGS. 1 and 2, in which a torque wrench assembly, generally indicated at 10, is disclosed. Generally speaking, assembly 10 comprises (a) a wrench member, generally indicated at 11, itself having a handle 12 coupled to a wrench head 13 and (b) a coupling arrangement, generally indicated at 20, for use in combination with wrench member 11.

It should be understood that wrench member 11 can be of any number of constructions, such as a ratchet wrench, well known in the art; a non-ratcheting member such as that disclosed by reference numeral 14 in U.S. Pat. No. 4,279,314; or of a more sophisticated type, such as those powered by air such as described in U.S. Pat. No. 6,298,753, hydraulics and/or an electric motor. As such, wrench member 11 should be understood to cover a wide variety of devices that provide the rotation, speed and torque function needed for the present invention and hence may be referred herein as a torque generating device. Advantageously, the present torque wrench assembly invention is preferably handheld, making it quite versatile as will be clearly seen below. Likewise, torque generating device 80, disclosed in connection with the second embodiment, may be identical to wrench member 11 or may be constructed in accordance with any of the foregoing exemplary devices.

The present invention primarily focuses on coupling arrangement 20. In particular, arrangement 20 comprises a housing 22, a transfer shaft 45 at least a portion of which is positioned therein, a first drive gear arrangement 23 coupled to transfer shaft 45 and a second drive gear arrangement 24 slidably coupled to transfer shaft 45.

In the preferred embodiment, first drive gear arrangement 23 is positioned within a first gear module (or housing), illustrated by the reference numeral 41 in FIG. 2. Similarly, second drive gear arrangement 24 is positioned within a second gear module (or housing), illustrated by the refereince numeral 26. It is within the scope of this invention that drive gear arrangements 23, 24 may be different from the disclosed worm gear configuration. Accordingly, the present invention is intended to cover any gear arrangement that provides the functionality and advantages afforded hereby, and in particular, the slidability of at least one of the gear arrangements, here second drive gear arrangement 24, as will be disclosed below.

First drive gear arrangement 23 preferably comprises a first worm gear 35 mounted on transfer shaft 45 and a second worm gear 40 orthogonally aligned with and rotatably coupled to first worm gear 35 by way of helical threads thereon. In a similar manner, second drive gear arrangement 24 comprises a third worm gear 30 mounted on transfer shaft 45 and a fourth worm gear 25 orthoganally aligned with and rotatably coupled to third worm gear 30. In a similar manner, worm gear 30 and worm gear 25 are rotatably coupled to each other by way of the illustrated helical threads.

Arrangement 20 also includes a first drive shaft 46 coupled to first drive gear arrangement 23, and more particularly, a portion of which, such as an end thereof, extending into the opening of second worm gear 40. The other end of first drive shaft 46 extends outwardly and upwardly from housing 22. In a similar manner, arrangement 20 also includes a second drive shaft 47 coupled to second drive gear arrangement 24 with an end thereof extending into the opening of worm gear 25. Likewise, the other end of second drive shaft 47 extends outwardly and upwardly from housing 22.

Importantly and in accordance with the present invention, at least second drive gear arrangement 24 is slidable along transfer shaft 45. Again, this slidability is achieved by the elimination of the intermediate gears found in the prior art. Specifically, the slidability is achieved by the mounting of worm gear 30 onto transfer shaft 45. In this way, the distance "l" between first drive shaft 46 and second drive shaft 47 (measured for example, from the centers of their respective longitudinal axes) is slidably adjustable.

Of course it is possible to also permit first drive gear arrangement 23 to be slidable as well, and an embodiment that provides therefor is disclosed below in connection with a second embodiment. However, for reasons that will become apparent below, it is contemplated in this first embodiment that first drive gear arrangement 23 is secured in its position within housing 22.

For ease of illustration and discussion, modules 26 and 41 have been omitted in FIG. 1. It can be seen that drive shaft 46 may, in one configuration, extend all the way through the opening in worm gear 40 in such a manner as to be coupled to wrench head 13 of wrench member 11. In this configuration, wrench head 13 preferably includes an aperture (not shown) into which the end of shaft 46 is positioned. It should be appreciated that an aperture in the bottom surface of housing 22 is thus provided to permit the end of drive shaft 46 to extend therethrough. In this way, it can be seen that first drive gear arrangement 23 is not constructed to be slidable along transfer shaft 45 since the aperture would be in a fixed position. It should be once again understood and appreciated that wrench member 11, thus adaptable to receive the end of drive shaft 46, can be of an electric type, battery operated type, hydraulically, air or otherwise mechanically driven.

As an alternative construction, wrench head 13 can include an adaptor that is coupled to the end of drive shaft 46 that extends through the bottom of housing 22. Still further, a socket or adapter from wrench head 13 can actually extend into the aperture and into the opening at the bottom of worm gear 40 so as to be coupled thereto. In this way, wrench member 11 causes the rotation of worm gear 40 directly, as opposed to the coupling of wrench head 13 and drive shaft 46. A wrench member of this type is shown by reference number 14 in U.S. Pat. No. 4,279,314.

Drive shaft 47 is coupled to fourth worm gear 25 by positioning a portion thereof, such as an end, inside the opening of worm gear 25. In this manner, second drive shaft 47 is parallely aligned to first drive shaft 46, while both the first and second drive shafts are thus orthogonally aligned to transfer shaft 45.

As can be most easily seen in FIG. 1, the ends of first drive shaft 46 and second drive shaft 47 that extend upwardly and outwardly from housing 22 are configured to receive respective adapters, such as sockets 52 and 50. It should be understood that the adapters that are receivable by the ends of drive shafts 46, 47 are numerous, and can also included by way of example, screwdriver tips, as the invention is not limited to the tightening or loosening only of nuts. The uniform tightening of bolts and screws, for example, are also clearly envisioned by the present invention. Additional adapters, such as adapters 60 and 62 can be used if necessary to mate differing shaft diameters and to ensure the proper interconnection between shafts 46, 47 and adapters 52, 50.

In order to provide the slidability of second module 26 (and/or the respective second gear arrangement 24), top surface 28 of housing 22 preferably includes a slot, indicated by reference numeral 55. The length of slot 55 will figure in the range within which module 26 can slide along transfer shaft 45 within cavity 29 of housing 22. Bumpers or other stopping means, such as rubber caps, washers or the like, can be put onto transfer shaft 45 to ensure that the range of slidability (in direction of the arrows "x" and "y") of second gear arrangement 24 is proper and within a selected/desired range for proper operation of the invention.

Not material to the present invention but discussed for completeness, is the obvious recognition that housing 22 may include one or more sidewalls that are removable for assembling and positioning the modules and transfer shaft and other internal components therewithin. FIG. 1 shows one configuration wherein a sidewall 26 is provided with screws 27. In a like manner, top surface 28 may be the side that is removable. Closing housing 22 in a satisfactory manner, such as with seals or the like, should be well understood by one skilled in the art. For example, the edges of the sidewalls opposing the removable sidewall(s) will preferably have threadable apertures for receiving the screws 27.

The operation of wrench assembly 10 will now be disclosed. As an overview, it is readily seen that the coupling of first and second drive gear arrangements 23, 24 to transfer shaft 45, and in particular, the coupling of worm gear 40 to worm gear 35, the mounting of worm gear 35 onto transfer shaft 45, the mounting of worm gear 30 onto transfer shaft 45 and the coupling of worm gear 25 to worm gear 30 all as disclosed above, provides for the simultaneous and equal rotation of worm gear 40 and worm gear 25. Consistent therewith, having drive shafts 46, 47 positioned in the respective drive gear arrangements as disclosed above will provide the simultaneously and equal rotation thereof when worm gear 40 and first drive shaft 46 are driven by wrench member 11.

That is, the force, speed and torque applied by wrench member (i.e. torque generating device) 11 to first drive gear arrangement 23, such as by way of the coupling of wrench member 11 and drive shaft 46 or by the coupling of wrench member 11 to gear 40 (wherein adaptors therefor may be used), will be seen to be distributed essentially uniformly or identically uniformly to both drive shafts. In this way the coupling of the drive gear arrangement via the transfer shaft provides that the first and second drive shafts are able to provide at least essentially, if not identically, equal torque. In this way, the objectives found in other multi-drive shaft torque wrenches are achieved along with the additional versatility of the slidable adjustability as set forth herein. By having the torque that is applied by shaft 46 (and hence adapter 52) to be at least essentially, if not identical, to the torque applied by shaft 47 (and hence adapter 50), more than one nut, bolt, screw or other fastening device can be simultaneously and uniformly tightened, thus overcoming the disadvantages and concerns present with the state of the art torque wrenches.

Figure 3:
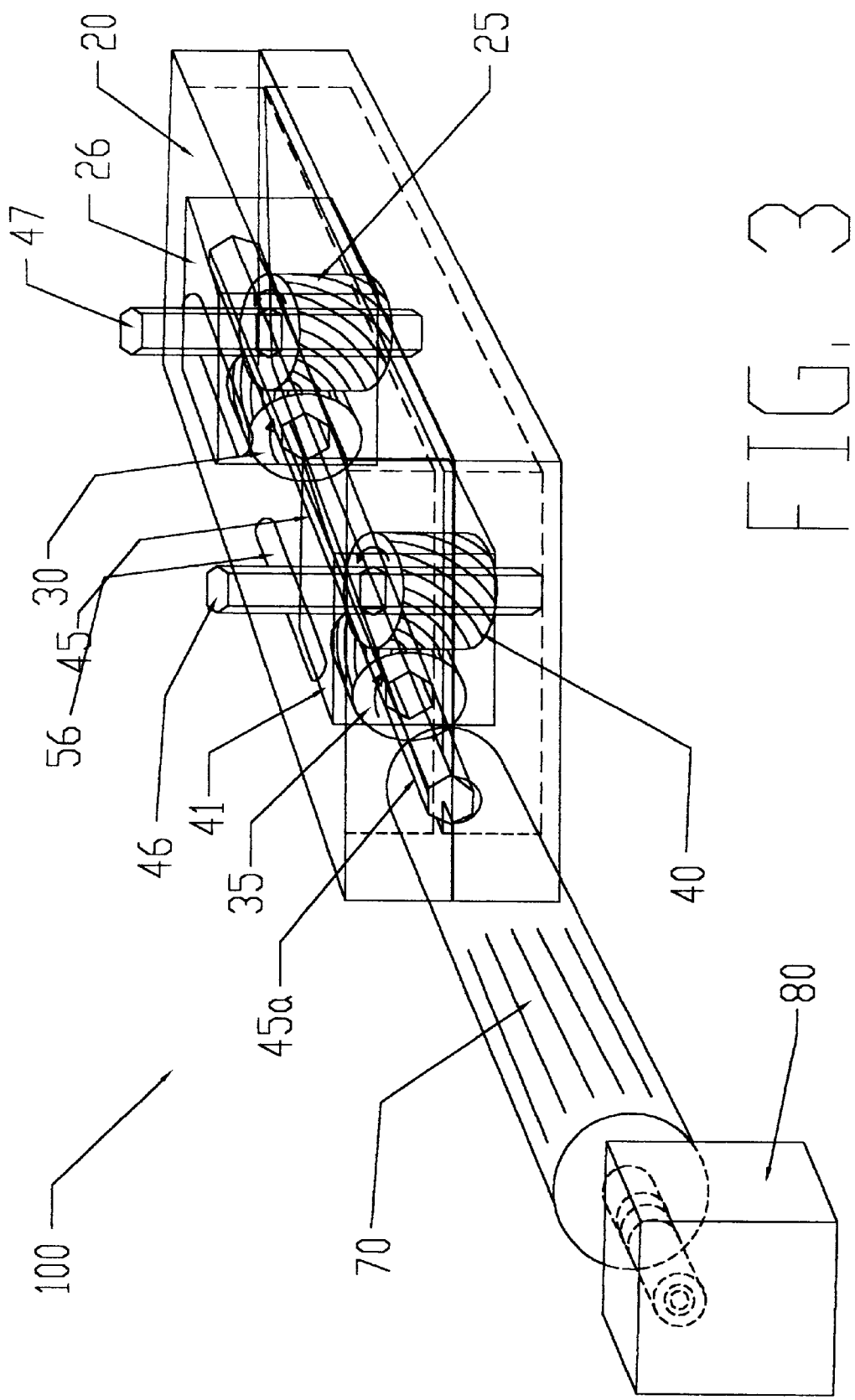
FIG. 3 is perspective view of a torque wrench assembly, comprising a torque generating device and a coupling arrangement used therewith, constructed in accordance with a second embodiment of the present invention.
Figure 4:
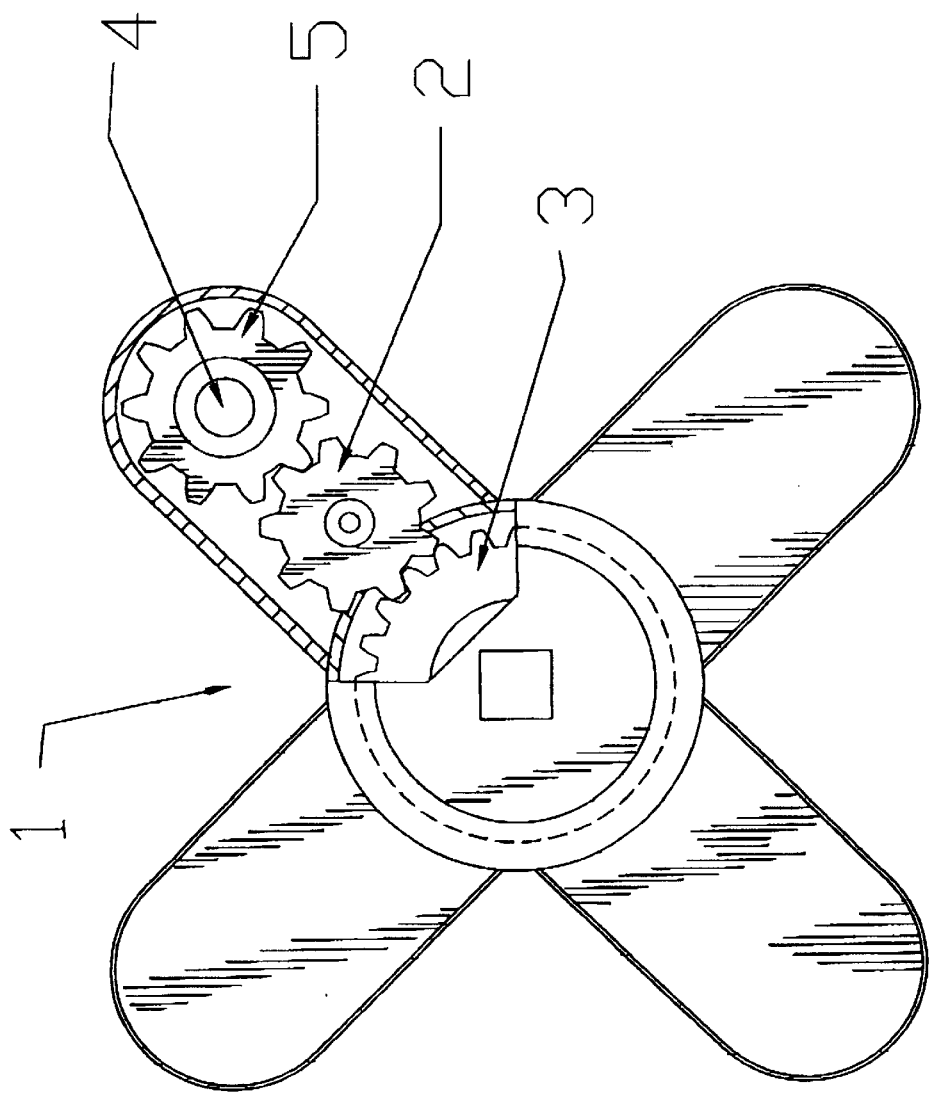
FIG. 4 is a plan view of a lug nut tool found in the prior art and showing features that are indicative of the perceived drawbacks overcome by the present invention.

Reference will now be made to FIG. 3 for a disclosure of a torque wrench assembly, generally indicated at 100, and constructed in accordance with a second embodiment of the present invention. Generally speaking, the second embodiment is very similar to the first embodiment, and the similar reference numerals are intended to convey this. The differences between this second embodiment and the first embodiment shall now be described.

Specifically in this second embodiment, an end 45a of transfer shaft 45 preferably extends out sidewall 26 and is coupleable to torque generating device 80. In one paticular embodiment, if torque generating device 80 is similar to a ratchet, an adaptor 70 may be provided for the coupling of device 80 and end 45a of transfer shaft 45. In a similar manner, device 80 may be seen to be a generic motor so as to have member 70 considered a part of the torque generating device. In this way, a smaller adaptor (not shown) may actually couple member 70 (now part of the torque generating device) to end 45a. Similarly, torque generating device 70 and/or 80 may be directly coupled to end 45a.

As will clearly be appreciated in this second embodiment, first drive gear arrangement 23 can now be slidable along transfer shaft 45 in the same manner as second drive gear arrangement 24. Here, a second slot 56 in top surface 28 is provided therefor.

Other than the difference of the torque generating device being coupled to the transfer shaft, and the ability of both drive gear arrangements to now be slideable, the operation of, function of, and advantages afforded by this second embodiment are the same as those disclosed above with regard to the first embodiment.

While the invention has been particularly shown and described with respect to preferred embodiments thereof, it will be understood by those skilled in the art that changes in form and details may be made therein without departing from the scope and spirit of the invention. For example, in the preferred embodiment, gears 25, 30, 35 and 40 are worm gears, but other gears that achieve the stated and implied functions above are contemplated hereby. Furthermore, the preferred material for gears 25, 30, 35, 40; shafts 45, 46, 47; and housing 22 is steel, although other materials can be used to achieve the objectives and advantages afforded by the present invention. Further, transfer shaft 45 and drive shafts 46 and 47 are preferably hexagonal in cross-section (and hence so are the corresponding openings in worm gears 30, 35 and worm gears 40 and 25) but this is by example and not limitation.

Still further it is contemplated that detents can be provided so as to have second drive gear arrangement 24 or in the case of the second embodiment, first drive gear arrangement 23 as well, releasably lockable or positionable at selected positions along transfer shaft 45. This will provide a user with a more versatile device when it is preferable to set the distance "l" between drive shafts 46 and 47 for a particular and/or repeated application. For example, this can be achieved by providing detents for releasably positioning the slideable modules within housing 22. In particular, the detents may comprise a ball and spring arrangement that allows the ball to fall into a shallow pocket (not shown) formed in cavity 29 of housing 22. In this way, the slidable module(s) will be stopped at a given center distance from the fixed (or otherwise "stopped") module. Graduated markings may also be provided on housing 22 to indicate where the slideable module(s) may be set. For instance, a "2½" line would indicate that the coupling arrangement would fit on the center line of a "U" bolt that would fit a 2½ inch diameter tube. Clearly, the detents can cover an significant plurality of center distances within a maximum and minimum range of the invention's configuration. As an example of the utility of the present invention with such a novel detent feature, use would be well appreciated in the exhaust installation field because they have clamps that are of a standard and fixed center distance. A second example of the invention's practicality is in the area of "chain-link" fence installers. However, these are exemplary uses since many more, as set forth herein, are contemplated by the present invention, regardless of whether detents as disclosed are actually used. As should be well understood, any of the slidable modules may have their own detents to indicate the desired center distances for a particular purpose. In this way, when wrench assembly 10 is being put to repeated use in a particular application, the constant readjusting of the distance "l" (by virtue of the slidable nature of one or more of the drive gear arrangements on transfer shaft 45) is eliminated.

Still further, the shape, size and configuration of adapters 50 and 52 can easily be changeable from a socket-like tip to a screwdriver-type tip, for example as set forth above.

Lastly, the present invention has been disclosed with respect to only two modules 26, 41 (i.e. two drive gear arrangements). It is contemplated herein that more than two modules (and hence more than two drive shafts) can be utilized. For example, housing 22, if elongated, could house more than two drive gear arrangements of the type disclosed herein. In this exemplary configuration, there could be additional drive gear arrangements axially aligned on transfer shaft 45. And, in this way, one or more of them can be slidably mounted thereon in the manner disclosed above. Even further should be the appreciation that coupling gears can be utilized to provide yet one or more additional transfer shafts. A gear arrangement to couple the rotation between two orthogonally (or even angularly) aligned transfer shafts should be well known in the art. In this way, additional uses of the present invention are achievable.

That is, it is envisioned that a tool to simultaneously tighten more than two nuts in a non-conventionally-shaped clamp or other fastener is provided hereby. More advantageously is the fact that such a construction, using the fundamental slidability features disclosed above, eliminates the heretofore requirement of many differently sized tools. By utilizing the present invention, only one such wrench assembly would be required notwithstanding more than one potential nut/bolt spacing arrangement. Lastly, it should be understood that other minor elements could additionally be provided to enhance the operation of the present invention. For example, spacers or other washer-type elements can be provided within the modules 26, 41 to more smoothly fit the respective worm gears therein. In particular, adapters, spacers or the like may need to be provided to ensure and/or adjust for tolerances between the various elements (such as an opening in a gear and one of the shafts) described herein, all of which should be well understood and appreciated by one skilled in the art.

Lastly, it is further envisioned that elongated worm gears 40 and 25 that extend outside the top of the housing can be used. In this way and depending on the application, shafts 46, 47 may not be needed. That is, the ends of the worm gears may have coupling configurations to remove or tighten a nut, or any other components, in a manner disclosed above. This embodiment is also recognized in the claims.

It can thus be seen that a wrench assembly as disclosed herein provides a novel construction for simultaneously tightening one or more fasteners to a predetermined torque specification. Moreover, by providing a construction that is handheld makes the device even more versatile and the applicability thereof is adaptable to many such uses. By providing a device that can be handheld during use, its portability increases its marketability. More importantly is the fact that the wrench assembly disclosed herein provides for the adjustability of the spacing between the drive shafts to provide for a more versatile and widely applicable tool. Still further, it can be seen that the present invention achieves the foregoing more efficiently and easily, as the use of intermediate gears are eliminated. Moreover, a more efficient construction is provided to achieve all of the foregoing, as opposed to the perceived complicated manner in which an intermediate gear on the prior art torque wrenches was needed. Moreover, at least essentially the same, if not identical torques and forces can be applied to drive shafts 46 and 47, all while achieving the advantage of providing the slidable adjustability of the drive shafts.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A torque wrench assembly comprising:

a housing;

a transfer shaft, at least a portion of which is positioned in the housing, a first drive gear arrangement coupled to the transfer shaft;

at least a second drive gear arrangement slidably coupled to the transfer shaft;

a first drive shaft coupled to the first drive gear arrangement and having an end extending from the housing;

a second drive shaft coupled to the second drive gear arrangement and having an end extending from the housing; and a torque generating device coupleable to at least one of the transfer shaft, first drive shaft and first drive gear arrangement;

whereby the distance between the first drive shaft and the second drive shaft is slidably adjustable by the slidability of the at least second drive gear arrangement along the transfer shaft; and whereby the coupling of the first drive gear arrangement and the at least second drive gear arrangement via the transfer shaft provides that the first and second drive shafts are able to provide an at least essentially equal torque.

2. The torque wrench assembly as claimed in claim 1, including a first gear housing and a second gear housing;

wherein the first drive gear arrangement is positioned within the first gear housing and the second drive gear arrangement is positioned within the second gear housing; and wherein the first drive gear arrangement comprises a first worm gear mounted on the transfer shaft and a second worm gear orthogonally aligned with and rotatably coupled to the first worm gear; and wherein the second drive gear arrangement comprises a third worm gear mounted on the transfer shaft and a fourth worm gear orthogonally aligned with and rotatably coupled to the third worm gear; and wherein the first drive shaft is coupled to the second worm gear and the second drive shaft is coupled to the fourth worm gear.

3. The torque wrench assembly as claimed in claim 2, wherein the first worm gear has helical threads and the second worm gear has helical threads and the helical threads of the first worm gear engages the helical threads of the second worm gear;

wherein the third worm gear has helical threads and the fourth worm gear has helical threads and the helical threads of the third worm gear engages the helical threads of the fourth worm gear.

4. The torque wrench assembly as claimed in claim 1, wherein the end of the first drive shaft extending from the housing is configured to receive an adapter and wherein the end of the second drive shaft extending from the housing is also configured to receive an adapter.

5. The torque wrench assembly as claimed in claim 1, wherein the housing includes a cavity; and at least the second drive gear arrangement is slideably disposed within the cavity and slides therein thus enabling the increase and decrease of the distance between the first drive shaft and the second drive shaft.

6. The torque wrench assembly as claimed in claim 1, wherein the second drive shaft is parallelly aligned to the first drive shaft.

7. The torque wrench assembly as claimed in claim 6, wherein the first drive shaft is orthogonally aligned to the transfer shaft.

8. The torque wrench assembly as claimed in claim 1, wherein the first drive shaft extends at its other end through a bottom of the housing and is coupled to the torque generating device.

9. The torque wrench assembly as claimed in claim 8, including an adaptor coupled to the torque generating device and the end of the first drive shaft extending through the bottom of the housing.

10. The torque wrench assembly as claimed in claim 1, including an adaptor coupled to the torque generating device and directly engageable with the first drive gear arrangement.

11. The torque wrench assembly as claimed in claim 1, wherein an end of the transfer shaft extends outside of the housing and wherein the end of the transfer shaft that extends outside of the housing is coupled to the torque generating device.

12. The torque wrench assembly as claimed in claim 11, wherein the first drive gear arrangement is also slidably coupled to the transfer shaft.

13. The torque wrench assembly as claimed in claim 11, including an adaptor coupled to the torque generating device and the end of the transfer shaft that extends outside of the housing.

14. The torque wrench assembly as claimed in claim 1, wherein the torque generating device is a ratchet wrench.

15. The torque wrench assembly as claimed in claim 1, wherein the torque wrench assembly is heldheld.

16. A torque wrench assembly comprising:

a coupling arrangement;

a torque generating device that is coupleable to the coupling arrangement;

wherein the coupling arrangement comprises:

a housing;

a transfer shaft, at least a portion of which is positioned in the housing, a first drive shaft having an end extending from the housing;

a second drive shaft having an end extending from the housing;

first drive gear means, coupled to the first drive shaft, for providing rotation of the transfer shaft;

at least second drive gear means, slidably coupled to the transfer shaft, for providing rotation of the second drive shaft;

wherein the distance between the first drive shaft and the second drive shaft is slidably adjustable by the slidability of the at least second drive gear means along the transfer shaft; and wherein the coupling of the first drive gear means and the at least second drive gear means via the transfer shaft provides that the first and second drive shafts are able to provide an at least essentially equal torque.

17. The torque wrench assembly as claimed in claim 16, including a first gear housing and a second gear housing;

wherein the first drive gear means is positioned within the first gear housing, and the second drive gear means is positioned within the second gear housing; and wherein the first drive gear means comprises a first worm gear mounted on the transfer shaft and a second worm gear orthogonally aligned.with and rotatably coupled to the first worm gear; and wherein the second drive gear means comprises a third worm gear mounted on the transfer shaft and a fourth worm gear orthogonally aligned with and rotateably coupled to the third worm gear; and wherein the first drive shaft is coupled to the second worm gear and the second drive shaft is coupled to the fourth worm gear.

18. The torque wrench assembly as claimed in claim 16, wherein the end of the first drive shaft extending from the housing is configured to receive an adapter and wherein the end of the second drive shaft extending from the housing is also configured to receive an adapter.

19. The torque wrench assembly as claimed in claim 16, wherein the first drive shaft extends at its other end through a bottom of the housing and is coupled to the torque generating device.

20. The torque wrench assembly as claim in claim 19, including an adaptor coupled to the torque generating device and the end of the first drive shaft extending through the bottom of the housing.

21. The torque wrench assembly as claimed in claim 16, including an adaptor coupled to the torque generating device and directly engageable with the first drive gear means.

22. The torque wrench assembly as claimed in claim 16, wherein an end of the transfer shaft extends outside of the housing and wherein the end of the transfer shaft that extends outside of the housing is coupled to the torque generating device.

23. The torque wrench assembly as claimed in claim 22, wherein the first drive gear arrangement is also slidably coupled to the transfer shaft.

24. The torque wrench assembly as claimed in claim 22, including an adaptor coupled to the torque generating device and the end of the transfer shaft that extends outside of the housing.

25. A coupling arrangement for use with a torque generating device in a torque wrench assembly, the coupling arrangement comprising:

a housing;

a transfer shaft, at least a portion of which is positioned in the housing, a first drive gear arrangement coupled to the transfer shaft;

at least a second drive gear arrangement slidably coupled to the transfer shaft;

a first drive shaft coupled to the first drive gear arrangement and having an end extending from the housing;

a second drive shaft coupled to the second drive gear arrangement and having an end extending from the housing;

wherein the distance between the first drive shaft and the second drive shaft is slidably adjustable by the slidability of the at least second drive gear arrangement along the transfer shaft; and wherein the coupling of the first drive gear arrangement and the at least second drive gear arrangement via the transfer shaft provides that the first and second drive shafts are able to provide an at least essentially equal torque.

26. The torque wrench assembly as claimed in claim 25, wherein the first drive shaft extends at its other end through a bottom of the housing and is coupleable to a torque generating device.

27. The torque wrench assembly as claimed in claim 26, including an adaptor coupled to the torque generating device and the end of the first drive shaft extending through the bottom of the housing.

28. The torque wrench assembly as claimed in claim 25, including an adaptor coupleable to a torque generating device and directly engageable with the first drive gear arrangement.

29. The torque wrench assembly as claimed in claim 25, wherein an end of the transfer shaft extends outside of the housing and wherein the end of the transfer shaft that extends outside of the housing is coupled to the torque generating device.

30. The torque wrench assembly as claimed in claim 29, wherein the first drive gear arrangement is also slidably coupled to the transfer shaft.

31. The torque wrench assembly as claimed in claim 29, including an adaptor coupled to the torque generating device and the end of the transfer shaft that extends outside of the housing.

* * * * *